United States Patent [19]

Dewhirst

[11] Patent Number: 5,200,475
[45] Date of Patent: Apr. 6, 1993

[54] EPOXY RESIN COMPOSITIONS CONTAINING DISECONDARY AROMATIC AMINES

[75] Inventor: Kenneth C. Dewhirst, Houston, Tex.
[73] Assignee: Shell Oil Company, Houston, Tex.
[21] Appl. No.: 709,903
[22] Filed: Jun. 3, 1991
[51] Int. Cl.[5] .............................................. C08G 59/50
[52] U.S. Cl. ..................... 525/486; 525/481; 528/97; 528/98; 528/99; 528/109; 528/124
[58] Field of Search ............... 528/124, 109, 99, 97, 528/98; 525/481, 486

[56] References Cited

U.S. PATENT DOCUMENTS

| | | | |
|---|---|---|---|
| 4,855,386 | 8/1989 | Bauer | 528/124 |
| 4,861,810 | 8/1989 | Dewhirst | 523/445 |
| 4,912,179 | 3/1990 | Murakami et al. | 525/524 |
| 4,983,672 | 1/1991 | Almer et al. | 525/65 |

Primary Examiner—John C. Bleutge
Assistant Examiner—Frederick Krass

[57] ABSTRACT

A lightly-crosslinked thermosettable formulation comprises (a) a diepoxy resin, (b) an aromatic diamine of the structural formula

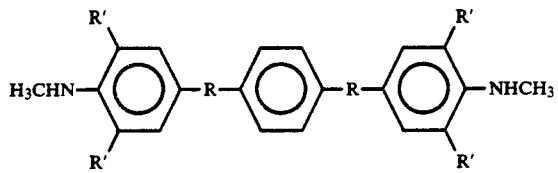

in which each R is a divalent linking moiety selected from $C_{1-6}$ alkylene, —S— and —O—, and R' is ethyl, (c) an amine or phenolic crosslinking agent, and (d) 2,6-dialkyl aniline. The formulation exhibits relatively long outlife and can be used as the matrix resin in aerospace composites applications.

5 Claims, No Drawings

EPOXY RESIN COMPOSITIONS CONTAINING DISECONDARY AROMATIC AMINES

BACKGROUND OF THE INVENTION

This invention relates to aromatic amine-containing epoxy resin compositions. In one aspect, the invention relates to the preparation of lightly-crosslinked thermoset materials having enhanced outlife.

It is known that epoxy resin formulations can be prepared which exhibit a balance of high glass transition temperature and toughness which make them good candidates for matrix resins in aerospace composites. Such formulations typically include a difunctional epoxy resin, a difunctional amine and a small quantity, in relation to the difunctional amine, of a multifunctional crosslinking agent. The formulations are designed so that, during the cure process, chain extension of the diepoxide by the diamine is the predominant reaction, with a minor degree of crosslinking occurring through the multifunctional component. The resulting "lightly-crosslinked thermosets" have enhanced toughness compared to fully-crosslinked materials.

In the application of such formulations to prepare composite materials, a "prepreg", or partially-cured reinforced epoxy, is prepared in an intermediate step in the fabrication of a composite part. "Outlife" is the period of time over which the prepreg remains in processable form. Diamines typically used in lightly-crosslinked thermoset formulations tend to have a short outlife, limiting the time over which the prepreg can be handled without refrigeration. It would be desirable to prepare lightly-crosslinked thermoset formulations which have longer outlife.

It is therefore an object of the invention to prepare epoxy resin-based lightly-crosslinked thermoset formulations having longer outlife.

BRIEF SUMMARY OF THE INVENTION

According to the invention, a curable composition is provided which comprises (a) a diepoxy resin, (b) an aromatic diamine which can be represented by the structural formula

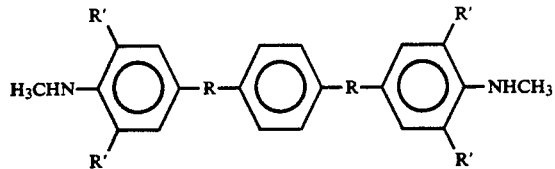

in which each R is a divalent linking moiety selected from $C_{1-6}$ alkylene, —S— and —O— and R' is ethyl; (c) an amine or phenolic crosslinking agent, and (d) a 2,6-dialkyl aniline. The invention composition exhibits enhanced outlife compared with formulations containing conventional difunctional amines.

DETAILED DESCRIPTION OF THE INVENTION

The invention composition includes an epoxy resin which has an average of about 2 vicinyl epoxide groups per molecule. Included within such diepoxy resins are diglycidyl derivaties of dihydric phenols and diamines. Among preferred epoxy resins are diglycidyl ethers which can be represented by the structural formula

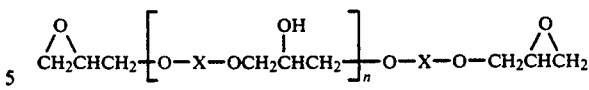

in which X is a divalent linking group characterized by stiff molecular units and optional flexible units, such as, for example, the diglycidyl ethers of 2,2-bis(4-hydroxyphenyl)alkanes and 9,9'-bis(hydroxylphenyl)-fluorene, and n is 0 to 6, preferably 0 to 2. Commercially-available examples of such epoxy resins include EPON Resin ® 828 and EPON HPT Resin ® 1079, products of Shell Chemical Company.

The invention composition also includes a difunctional aromatic amine which can be represented by the structural formula

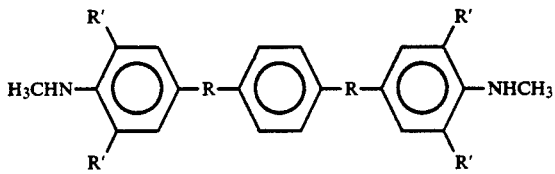

in which R is a divalent linking moiety selected from $C_{1-6}$ alkylene, —S— and —O—, and R' is ethyl. The difunctional amine is present in the composition in an amount within the range of about 30 to about 50, preferably about 35 to about 45, mole percent based on the diepoxy resin. The preferred difunctional aromatic amine is $\alpha,\alpha'$-bis(3,5-diethyl-4-methylaminophenyl)-1,4-diisopropylbenzene.

The invention composition includes a 2,6-dialkyl aniline present in an amount of about 20 to about 40, preferably about 25 to about 35, mole percent based on of the diepoxy resin. Such anilines include 2,6-dimethylaniline, 2,6-diethylaniline and 2,6-diisopropylaniline, with 2,6-diethylaniline being preferred.

The invention composition includes a multifunctional amine or phenolic crosslinking agent present in an amount within the range of about 25 to about 50, preferably about 30 to about 40, mole percent based on the diepoxy resin. Such multifunctional crosslinking agents include $\alpha,\alpha'$-bis(3,5-dialkyl-4-aminophenyl)-1,4-diisopropylbenzene, 4,4'-methylenedianiline, p-phenylenediamine, m-phenylenediamine, alkylated m-phenylenediamines, phenol-formaldehyde novolacs, p-aminophenol and the tetraphenol of ethane, for example.

The invention compositions are useful as matrix resins for aerospace composites. Such composites are fabricated by impregnating a fibrous reinforcing material such as carbon fibers with the uncured resin formulation and heating at a temperature of about 120° to 180° C. for a time sufficient to partially cure the resin, forming the prepreg into the desired shape, and heating the prepreg above about 180° C. for a time sufficient to fully cure the resin.

EXAMPLE 1

Preparation of $\alpha,\alpha'$-bis(3,5-dimethyl-4-methylaminophenyl)-1,4-diisopropylbenzene $\alpha,\alpha'$-Bis(3,5-dimethyl-4-aminophenyl)-1,4-diisopropylbenzene (400 g; 1.0 mole), 860 ml of ethyl formate, 430 ml of o-dichlorobenzene and 0.5 g of BF$_3$.MEA catalyst were refluxed in a round-bottom flask equipped with reflux condenser and stirrer for 6-7 days. The resulting slurry was mixed with 400 ml of hexane, cooled, filtered and washed with 1.0 L toluene and 1.5 L hexane. The solid was dried in vacuo at 110° C. to give about 270 g of crude bis-formyl derivative (m.p. 207°-230° C.). Analysis by HPLC and NMR indicated the presence of both mono- and bis-adducts. This mixed product was recycled under identical conditions to provide a mixed mono- and bis- reaction product which was about 70 percent of the bis- material. 50 g (0.11 mole) of this product was added in portions to 300 ml of dry 1.0 M lithium aluminum hydride in tetrahydrofuran solution under nitrogen. The solution was refluxed for 2 days. 46 ml of water were added slowly with stirring to the cooled solution maintained below 20° C. The solution was then refluxed for 2 hours, cooled, filtered and evaporated after addition of 2-3 crystals of BHT stabilizer to give 42 g of crude product (m.p. 110°-115° C.). Repeated crystallization from methanol gave an essentially pure product (m.p. 128°-129° C.). The structure was confirmed by NMR.

Preparation of α,α'-bis(3,5-diethyl-4-methylaminophenyl)-1,4-diisopropylbenzene 400 g (0.88 mole) of α,α'-bis(3,5-diethyl-4-aminophenyl)-1,4-diisopropylbenzene was treated as above to give 150 g crude bis-formyl derivative (m.p. 230°-234° C.). All the crude derivative was reduced with lithium aluminum hydride as above to give about 120 g of product (m.p. 105°-108° C.). Recrystallization from methanol gave an essentially pure product (m.p. 109°-110° C.). Structure was confirmed by NMR.

Preparation of a lightly-crosslinkable formulation

The respective amounts of the diglycidyl ether of bisphenol-A, diglycidyl ether of the bisphenol of fluorenone, unsubstituted or substituted α,α'-bis(4-methylaminophenyl)-1,4-diisopropylbenzene, 2,6-diethylaniline and multifunctional crosslinking agent shown in Table 1 (5 g total) were melt-blended, poured into a 20 ml screw-cap vial, and quenched to room temperature. Tack was determined by testing the resulting tacky liquids with a wooden dowel until they no longer felt sticky.

TABLE 1[1]

| DGEBPA/DGEBPFL | Diamine[2] | DEA[3] | Crosslinker[5] | Outlife[4] |
|---|---|---|---|---|
| 50/50 | 40 (R=H) | 30 | 30 | 3 |
| 50/50 | 40 (R=CH$_3$) | 30 | 30 | 5 |
| 50/50 | 40 (R=CH$_2$CH$_3$) | 30 | 30 | 11 |

[1] All values in equivalents, physical mixture

[2] 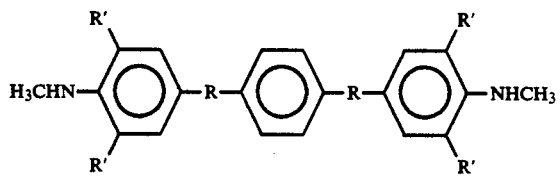

[3] 2,6-Diethylaniline
[4] Days to loss of tack
[5] α,α'-bis(3,5-diethyl-4-aminophenyl)-1,4-diisopropylbenzene

We claim:
1. A composition comprising:
   (a) an epoxy resin having an average of about 2 vicinyl epoxide groups per molecule;
   (b) from about 30 to about 50 mole percent based on the epoxy resin, of an aromatic amine which can be represented by the structure formula

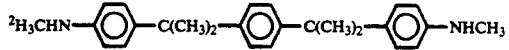

in which each R is a divalent linking moiety selected from the group consisting of C$_{1-6}$ alkylene, —S— and —O—, and each R' is ethyl;
   (c) from about 20 to about 40 mole percent based on the epoxy resin, of 2,6-dialkyl aniline; and
   (d) from about 25 to about 50 mole percent based on the epoxy resin, of a multifunctional amine or phenolic crosslinking agent selected from the group consisting of a,a'-bis(3,5-dialkyl-4-aminophenyl)-1,4-diisopropylbenzene, 4,4'-methylenedianiline, p-phenylenediamine, m-phenylenediamine, alkylated m-phenylenediamines, phenol-formaldehyde novolacs, p-aminophenol and the tetraphenol of ethane.

2. The composition of claim 1 in which the aromatic amine is α,α'-bis(3,5-diethyl-4-methylaminophenyl)-1,4-diisopropylbenzene.

3. The composition of claim 2 in which the 2,6-dialkyl aniline is 2,6-diethyl aniline.

4. The composition of claim 3 in which the epoxy resin is a mixture of the diglycidyl ether of bisphenol-A and the diglycidyl ether of 9,9'-bis(hydroxyphenyl)fluorene.

5. The composition of claim 4 in which the crosslinking agent is α,α'-bis(3,5-dimethyl-4-aminophenyl)-1,4-diisopropylbenzene.

* * * * *